United States Patent [19]

Schiöberg

[11] 3,875,541

[45] Apr. 1, 1975

[54] ARRANGEMENT FOR MOUNTING A MICROWAVE COMPONENT WITH A SOLDERLESS GROUND CONNECTION

[75] Inventor: Eva-Maria Schiöberg, Backnang, Germany

[73] Assignee: LICENTIA Patent-Verwaltungs-GmbH, Frankfurt, Germany

[22] Filed: Nov. 30, 1973

[21] Appl. No.: 420,464

[30] Foreign Application Priority Data

Nov. 30, 1972 Germany ............................ 2258557

[52] U.S. Cl. ............................ 333/97 R, 174/35 GC

[51] Int. Cl. ............................................ H05k 9/00

[58] Field of Search ................. 333/84 M, 97 R, 12; 174/35 GC, 35 MS

[56] References Cited

UNITED STATES PATENTS

| | | | |
|---|---|---|---|
| 3,258,724 | 6/1966 | Walsh et al. | 333/84 M |
| 3,329,898 | 7/1967 | Tuck et al. | 333/84 R |
| 3,582,833 | 6/1971 | Kordos | 333/84 M |
| 3,725,829 | 4/1973 | Brown | 333/97 R |

*Primary Examiner*—Alfred E. Smith
*Assistant Examiner*—Wm. H. Punter
*Attorney, Agent, or Firm*—Spencer & Kaye

[57] ABSTRACT

An arrangement for mounting a microwave component with a solderless ground connection. The microwave component is mounted on a substrate which is positioned within a housing. The housing has a conductive part and a step-shaped portion against which the substrate is positioned. A metallization layer is provided on a wall of the substrate opposite the step-shaped portion of the housing. A conductive member, which is made of an elastically deformable conductive material, is positioned against the metallization layer and is also positioned against the conductive part of the housing. A pressure member presses the conductive member against the metallization layer so as to provide a ground connection between the layer and the conductive part of the housing.

4 Claims, 1 Drawing Figure

PRINT OF DRAWINGS
AS ORIGNALLY FILED
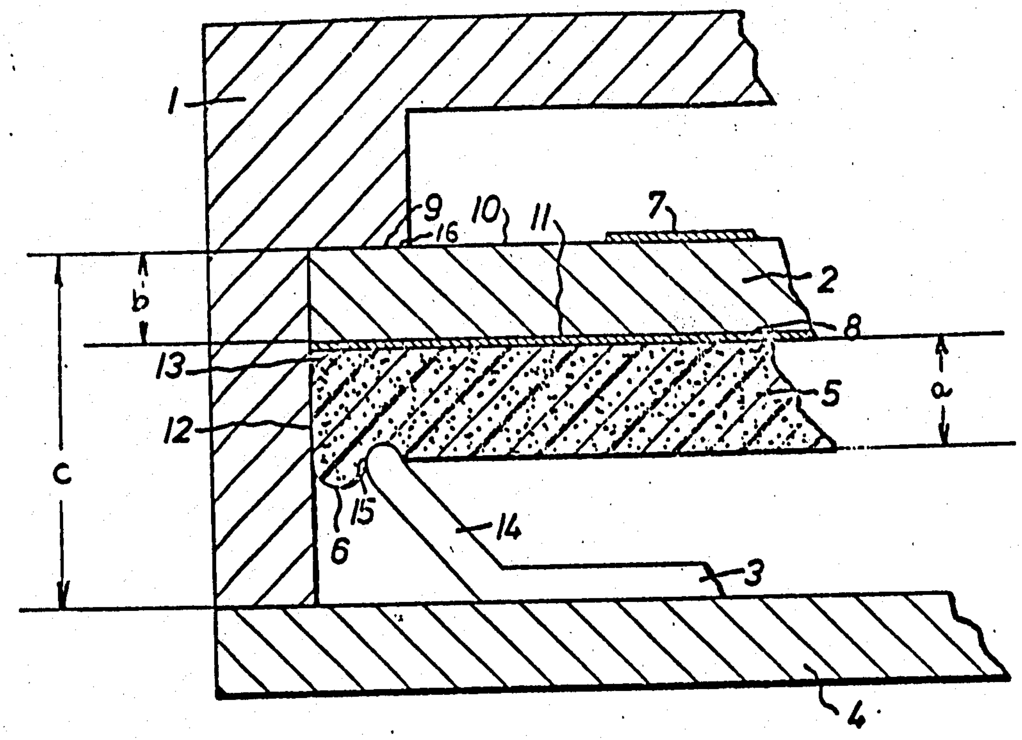
Applicant: Eva-Maria Schiöberg
Filed November 30th, 1973

ARRANGEMENT FOR MOUNTING A MICROWAVE COMPONENT WITH A SOLDERLESS GROUND CONNECTION

BACKGROUND OF THE INVENTION

The present invention relates to an arrangement for providing a solderless ground connection for a microwave component which is mounted on a substrate in an associated housing.

In mounting a microwave component, it is often required that a solderless ground contact be provided. Such a contact is required partly since the heat produced during soldering would change the properties of the microwave components or could even lead to the destruction of the components if soldering takes place several times. Additionally, there are certain situations where the ground contact must be disconnected relatively often. In the above-mentioned situations, there exists the prerequisite that it be possible to properly reestablish the ground connection especially with regard to its electrical characteristics. This has been solved in practice in that the contact is produced with suitably designed spring elements. Aside from the expenditures required for such a construction, it has been found that a ground connection of this type exhibits different resistance values after repeated disconnections and reinstallations, i.e., the contact with ground was no longer reproduceable in the desired manner.

SUMMARY OF THE INVENTION

An object of the present invention is to provide an easily produceable ground connection which does not require soldering and nevertheless provides reproduceable values for the ground connection so that it can be used in the microwave region.

BRIEF DESCRIPTION OF THE DRAWING

The FIGURE is a cross-sectional elevational view of one embodiment of the present invention for providing a solderless ground connection for a microwave component.

DESCRIPTION OF THE PREFERRED EMBODIMENTS

In the illustrated drawing FIGURE, a housing 1 is provided with a suitable step 16 to accommodate a microwave circuit 7 mounted on a substrate 2. The microwave component 7 is mounted on the upper side 10 of the substrate 2. This microwave component may be, for example, a 3 dB coupler or a circulator.

The underside 11 of the substrate 2 is provided with a metallization layer 8 which is to be connected to ground. The substrate 2 is inserted into housing 1 for this purpose so that its upper side 10 rests with its edge 9 on step 16 in the housing. A conductive member 5, which is made of an elastic material and has good conducting properties, is provided. This member 5 contains a plurality of small metal particles which contact one another and are thus able to produce a well conducting connection when the elastic material 5 is pressed against the metallization layer 8. With the aid of the appropriately constructed pressure member 3, the elastic conductive member 5 is pressed against the metallization layer 8 of the substrate 2 and simultaneously against the wall 12 of housing 1. Since at least a portion of wall 12 is made of a conductive material, the desired ground connection is produced between layer 8 and wall 12. One operative embodiment of the invention as shown in the FIGURE was built up in the following manner:

the housing 1 and the housing cover 4 are brass members with a silver plating;

the substrate 2 is a ceramic plate of one inch square of $Al_2O_3$ with a relative dielectric constant $\epsilon_3$ of about 9.6;

the thickness $b$ of part 2 ist 635 $\mu$m;

the metallization layers 7 and 8 on opposite sides of the substrate 2 are made by Au plated Cu with a thickness of 5 $\mu$m;

the presser member 14 consists of nickel silver;

the distance $c$ between the housing cover 4 and the step 16 will be choosen in dependance of the necessary pressure e.g., 10 mm;

the part 5 has a thickness of about 1.2 mm;

for that conductive and elastic part 5 varions materials can be choosen e.g., wickerwork or texture. Preferably part 5 consists of an elastic dielectric material containing a plurality of small metallic parts. One operative embodiment of the invention used an elastic silicone material with small silver parts for example the material Cho-SiL fabricated by the Chomerics Inc. Woburn, Mass. in USA.

Another embodiment of the invention suitable for the frequency of 12 GHz differs from the above described arrangement in the following parts:

the substrate 2 was a rectangular plate 1×2 inch of tetra fluorethylene threngthened with fiber glass the thickness $b$ of it was 1.52 mm. This material with the name Teflon DYP 525 is manufactured by the Detekta Inc. Hamburg in Western Germany.

In the illustrated embodiment, the pressure member 3 is an elastic body in the shape of a housing, which includes a bottom plate and an end wall 14. The end wall is preferably bent obliquely outwardly by an angle of approximately 45° with respect to the bottom plate. The end wall 14 has a rounded end 15 which is pressed against the conductive member 5 with a predetermined force applied by the housing cover 4. The pressure member thus preferably presses the conductive member 5 into a corner 13 lying between the housing wall 12 and the metallization layer 8 of the substrate 2.

In a modified embodiment of the present invention, the end wall 14 is dimensioned so as to be smaller than the inner dimension of the housing 1 and thus is spaced from the wall 12. When the pressure member 3 is then pressed against the substrate 2, a part 6 of the conductive member 5 is disposed so as to lie between the end of the end wall 14 of the pressure member 3 and the housing wall 12. This results in a good ground connection between the metallization layer 8 and the housing wall 12 over the shortest possible path with respect to high frequencies. The edge 15 of the end wall 14 of the pressure member is preferably appropriately widened or rounded in this embodiment in order to prevent damage to the conductive member 5.

As has been found from experimentation with this arrangement, the ground connection provides an easily reproduceable contact with a sufficiently low resistance value to permit its utilization for operation in the microwave region.

The arrangement of the present invention can be utilized with particular advantage for contacting microwave circuits which are mounted on ceramic substrates.

It will be understood that the above description of the present invention is susceptible to various modifications, changes and adaptations, and the same are intended to be comprehended within the meaning and range of equivalents of the appended claims.

I claim:

1. In an arrangement for mounting a microwave component including a housing, a substrate on which the microwave component is positioned, the substrate being positioned within the housing, and contact means for providing a solderless ground connection for the microwave component, the improvement wherein: said housing has a step-shaped portion and at least a part of one wall of said housing is conductive; said substrate has two opposed longitudinal surfaces, one of which is positioned against said step-shaped portion; said substrate includes a metallization layer disposed on the other said surface; said contact means includes a conductive member made of an elastically deformable conductive material, said conductive member contacting said metallization layer of said substrate and said conductive part of said housing, and pressure means for pressing said conductive member against said metallization layer so as to provide the ground connection between said metallization layer and said conductive part of said housing; said substrate has an edge section which abuts against said housing so as to define a corner and said pressure means presses said conductive member substantially into said corner; and said pressure means is a housing-shaped member, said housing-shaped member including an end wall which extends at an oblique angle toward said conductive part of said housing and which has an outer edge pressing against said conductive member.

2. An arrangement as defined in claim 1 wherein said housing-shaped member of said pressure means has a longitudinal wall connected to said end wall and said end wall extends outwardly at an angle of approximately 45° with respect to said longitudinal wall.

3. An arrangement as defined in claim 1 wherein said outer edge of said end wall is spaced from said conductive part of said housing so that when said pressure means is pressed against said substrate, a portion of said conductive member is disposed between said outer edge and said conductive part.

4. An arrangement as defined in claim 1 wherein said substrate is made of a ceramic material.

* * * * *